United States Patent
Ellsaesser

(10) Patent No.: US 6,705,552 B2
(45) Date of Patent: Mar. 16, 2004

(54) COMPOST SPREADER

(76) Inventor: T. Daniel Ellsaesser, 6833 Old Mill Rd., North Richland Hills, TX (US) 76180

(*) Notice: Subject to any disclaimer, the term of this patent is extended or adjusted under 35 U.S.C. 154(b) by 164 days.

(21) Appl. No.: 09/999,473

(22) Filed: Nov. 15, 2001

(65) Prior Publication Data

US 2003/0089805 A1 May 15, 2003

(51) Int. Cl.⁷ .............................................. A01C 17/00
(52) U.S. Cl. ...................... 239/668; 239/680; 239/685; 222/620; 222/624
(58) Field of Search ............................... 239/668, 680, 239/685, 686; 222/624, 625, 274, 275, 620

(56) References Cited

U.S. PATENT DOCUMENTS

| | | | | |
|---|---|---|---|---|
| 510,498 A | * | 12/1893 | Brewster | 222/625 |
| 1,573,493 A | * | 2/1926 | Heyd | 222/274 |
| 1,948,861 A | * | 2/1934 | Lindgren | 222/274 |
| 1,965,483 A | * | 7/1934 | Woods | 222/625 |
| 2,193,253 A | * | 3/1940 | Masters | 222/624 |
| 2,778,540 A | * | 1/1957 | Seltzer | 222/625 |
| 2,940,640 A | * | 6/1960 | Erickson | 222/625 |

* cited by examiner

Primary Examiner—Dinh Q. Nguyen
(74) Attorney, Agent, or Firm—Charles D. Gunter, Jr.

(57) ABSTRACT

A mobile spreader is shown for distributing composted materials over a ground surface. The spreader has a hopper for receiving material to be transported and distributed and a ground engaging wheel assembly for supporting the hopper for transport across the ground. A combination mixing and distribution element is rotatably mounted in the interior of the hopper for conveying material received in the hopper interior to an elongated outlet located in a discharge area of the hopper. The combination mixing and distribution element comprises a shaft having a longitudinal axis with a number of discs located at spaced axial distances thereon. The discs are uniformly inclined at an angle in the range of 15–20° relative to line drawn perpendicular the longitudinal axis of the shaft. The discs are separated by one or more tines located on the shaft and also inclined at an angle in the range of 15–20° relative to a line drawn perpendicular to the longitudinal axis of the shaft.

9 Claims, 3 Drawing Sheets

COMPOST SPREADER

BACKGROUND OF THE INVENTION

1. Field of the Invention

The present invention relates generally to mobile spreaders for spreading organic fertilizer type materials and, more specifically, to a type of spreader specifically adapted for spreading compost.

2. Description of the Prior Art

Compost has been defined as any organic material that has undergone a biodegradation process. For example, compost includes decomposed leaves, sewage, sludge which has been mixed with wood chips or other material to allow air to permeate the sludge and cow or barnyard manure which has been allowed to dry in the air or which has been pasturized by chemical treatment, windrowing, or the like. Cow manure, as available from home and garden stores or feed and grain stores, is especially preferred for use in the present invention. The material is dry and powdery in nature as obtained from commercial sources and can present problems with lumping or clogging of conventional fertilizer spreaders.

Compost is typically applied to home lawns, gardens and fields, golf courses, parks and playgrounds as a thin even top dressing. Both box type manure spreaders and side delivery manure spreaders have been used in the past. The box type spreader generally includes a square or rectangularly shaped box with a conveyor in the bottom thereof for moving material toward a discharge beater mounted at the rear of the box. This type of manure spreader is unsatisfactory for spreading compost because it produces a lumpy spread pattern and compost tends to clog the discharge region of the spreader. Side delivery systems generally include a V-shaped tank with an auger in the bottom thereof for moving material toward an expeller mounted on the side of the tank. This type manure spreader is less than satisfactory because it produces an uneven spread pattern and creates a dust problem due to the high speed of the expeller.

A need exists, therefore for a compost spreader which is simple in design and economical to manufacture which produces a more even spread pattern without creating undue dusting and which does not clog when distributing compost type material.

A need also exists for such a device which can be hand operated, which can be powered by a small gasoline engine, or which can be pulled behind a tractor or other conveyance device.

SUMMARY OF THE INVENTION

It is therefore one object of the present invention to provide a simple and efficient device for spreading compost which can be used to fertilize or treat areas ranging from a homeowner's lawn to a golf course, park, or agricultural application.

It is another object of the invention to provide such a device which is simple in design and economical to manufacture and which can be adapted for a variety of propulsion mechanisms.

Another object of the invention is to provide such a device which provides an even spread pattern without creating dusting problems or clogging problems at the discharge region of the device.

Another object of the invention is to provide such a device which can handle various grades of compost without bridging, regardless of the nature of the material and the ambient weather conditions.

The mobile spreader of the invention is used for spreading compost materials which are typically dry, processed solids. The spreader includes a hopper for receiving material to be transported and distributed, the hopper having a front wall, a rear wall, opposing side walls and a bottom wall which walls together define an initially open interior. A ground engaging wheel assembly is provided for supporting the hopper for transport across the ground. A combination mixing and distribution element is rotatably mounted in the interior of the hopper for conveying material received in the hopper interior to an elongated outlet located in a discharge area of the hopper. A closure mechanism having a retractable slat or gate is positionable at variable angular positions for varying the discharge area of the hopper.

Preferably, the combination mixing and distribution element comprises a shaft having a longitudinal axis and having a plurality of discs located at spaced axial distances thereon, the discs being uniformly inclined at an angle in the range of 18–20° relative to line drawn perpendicular the longitudinal axis of the shaft. The combination distribution and mixing element also has a plurality of tines located on the shaft. Each tine is located between a pair of discs. In the preferred embodiment of the invention, the tines are also inclined at an angle in the range of 18–20° relative to a line drawn perpendicular to the longitudinal axis of the shaft so that they lie in planes generally parallel to the planes of the discs.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
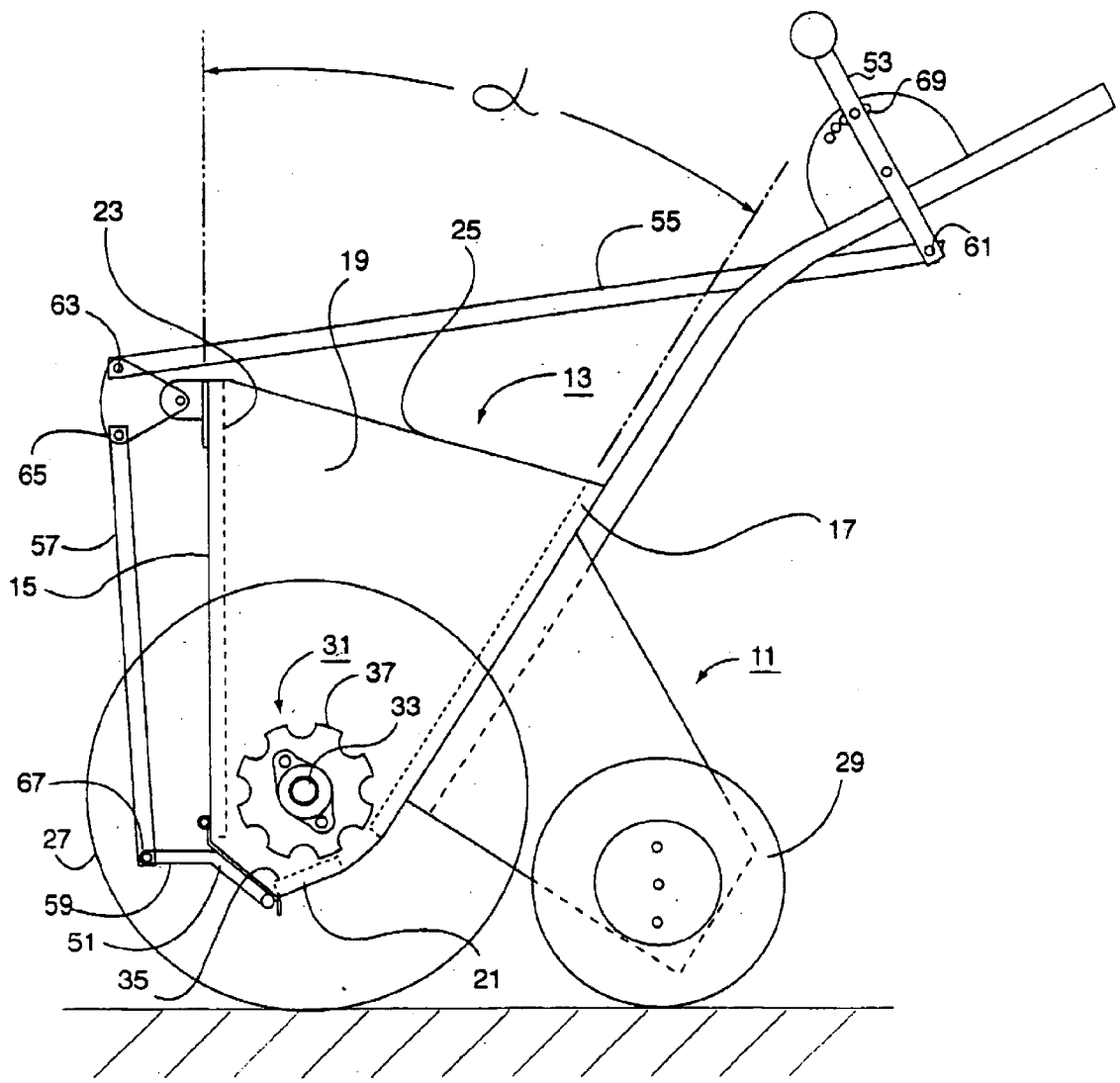
FIG. 1 is a simplified, side view of the device of the invention showing one of the discs of the combination mixing and distribution element as well as the discharge opening and closure mechanism thereof.

Turning to FIG. 1, there is a shown a mobile spreader of the invention designated generally as 11. The spreader 11 is used for spreading organic fertilizer type materials and is particularly useful in spreading composted materials. In a particularly preferred embodiment, the device is used for spreading dry, composted cow or barnyard manure. Several features of the invention make it particularly well adapted for spreading either light, powdery or dry, clumpy composted manure. The device of the invention produces an even spread pattern on a lawn, golf course, field or other surface without creating a dust problem.

The mobile spreader 11 includes a hopper 13 for receiving compost material to be transported and distributed. The hopper has a front wall 15, a rear wall 17 and opposing sidewalls (19 shown in FIG. 1). The hopper also includes a bottom wall 21 which together with the remaining walls defines an initially open interior 23. In the side view shown in FIG. 1, the hopper 13 constitutes a trapezium, that is a plane figure with four sides, no two of which are parallel. Alternately, one could say that with an imaginary line drawn across the bottom wall region 21 parallel to the top edge 25 would constitute a trapezoid. The hopper is preferably of either sheet metal or high-density plastic material and contains approximately 2 to 4 cubic feet in the embodiment illustrated. The example 2×4 foot capacity hopper illustrated can be used to spread an area of approximately 180 feet without refilling the hopper. Also, as shown in FIG. 1, the front and rear walls 15, 17 define an angle "α" in the range from about 30 to 40°, most preferably about 35°. These dimensions and angles have been found to be critical in providing the proper amount of feed to a discharge area of the hopper to prevent bridging and clogging of the device.

The spreader 11 has a ground engaging wheel assembly, in this case constituting a pair of front drive tires (27 shown in FIG. 1) and a rear support tire 29. The wheel assembly supports the hopper 13 for transport across the ground.

Figure 2:
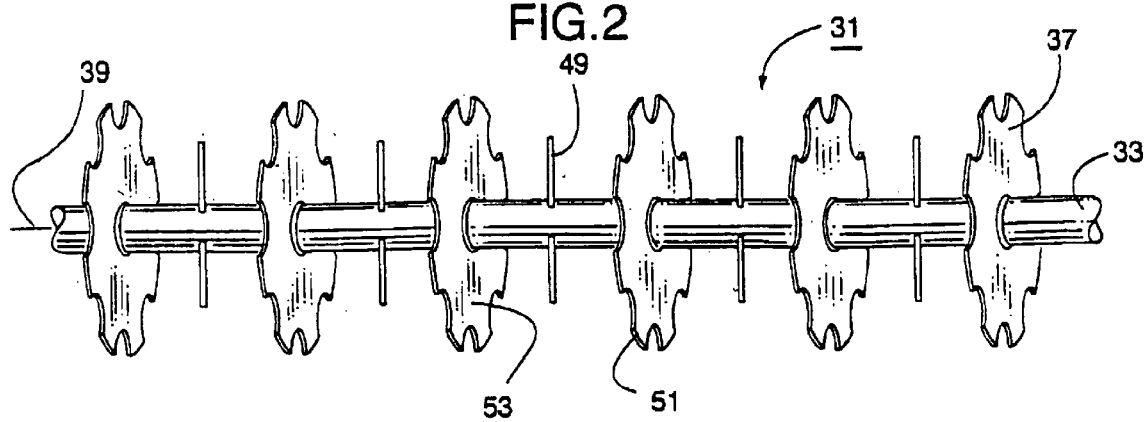
FIG. 2 is an isolated view of the combination mixing and distribution element of the invention showing the spacing of the discs and tines.
Figure 3:
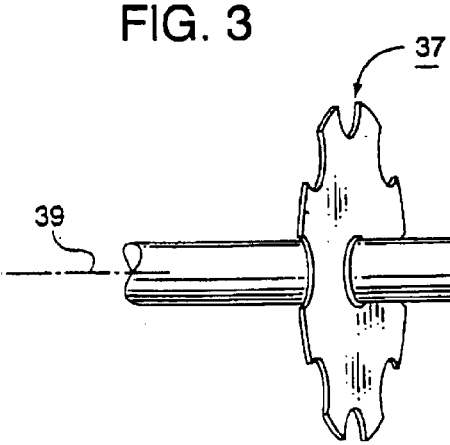
FIG. 3 is a side view of one of the discs used on the combination mixing and distribution element showing the scalloped face thereof.
Figure 4:
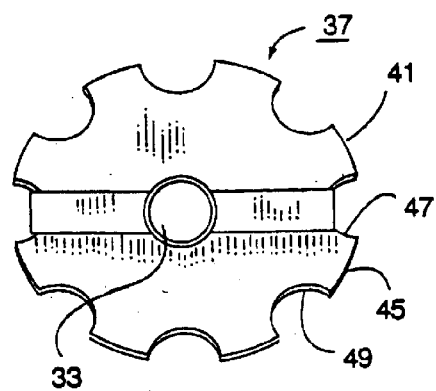
FIG. 4 is a perspective view of the disc of FIG. 3.

A combination mixing and distribution element 31 is rotatably mounted in the interior 23 of the hopper 13 for conveying material received in the hopper interior to an elongated outlet 35 which is located in a discharge region of the hopper. The shaft 33 is rotatably mounted on the assembly by means of suitable bearing structures (not shown) located at either end of the shaft. FIG. 2 shows the combination mixing and distribution element 31 in greater detail. As shown in FIG. 2, the shaft 33 has a plurality of discs 37 located at evenly spaced intervals along the longitudinal axis 39 thereof. As shown in FIGS. 3 and 4, each disc 37 has a circumferential outer perimeter which forms a series of scallops 43. In the embodiment illustrated in FIG. 3, there are eight evenly spaced scallops. Each scallop 43 has an outer, blunt face 45 which is defined between a pair of oppositely sloping sides 47, 49. The scallops form a continuous flighting on the mixing and distribution element 31 with the outer perimeter edge 41 substantially spanning the opening distance of the discharge region of the hopper.

FIGS. 6–9 show alternate disc and teeth designs which are useful for the spreader discs. The disc 71 is FIG. 6 has scallops 73 which are more elongated and which slope between shorter sides 75 and relatively longer sides 77, the sides defining a crest 79 there between.

Figure 7:
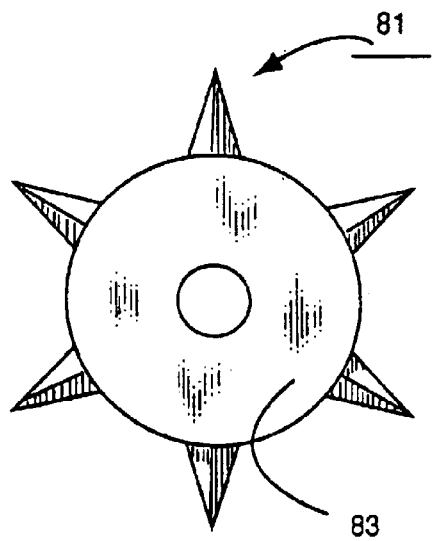
FIG. 7 is a view similar to FIG. 6 of another disc useful for the present invention.

The disc 81 of FIG. 7 has projections 83 in the form of a of spin rowel.

Figure 8:
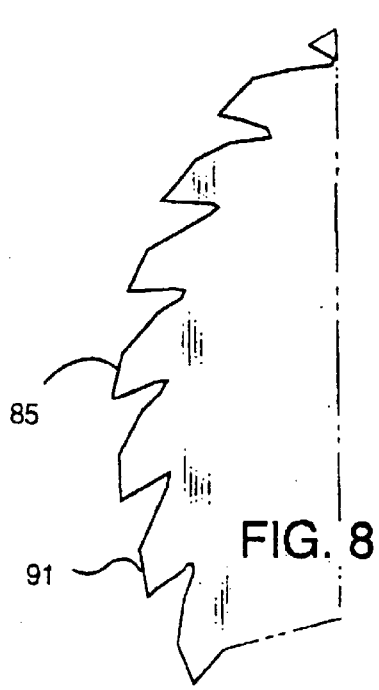
FIGS. 8 and 9 are views of alternate teeth patterns which can be used on the discs of the invention.
Figure 9:
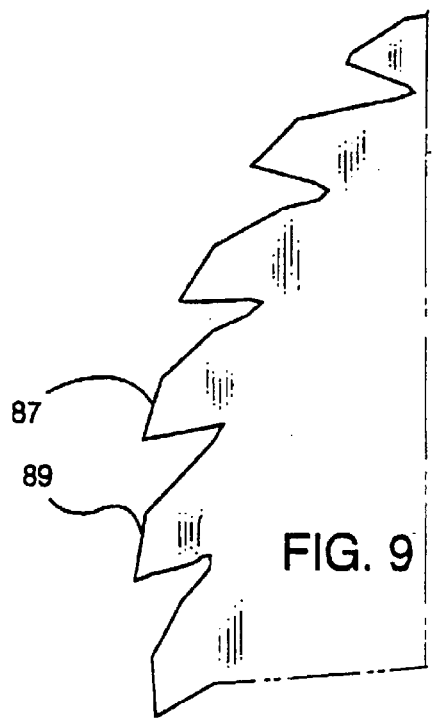

The disc teeth 85, 87 shown in FIGS. 8 and 9 are similar to those found on a ripping or saber saw blade. The teeth crests 89 in FIG. 9 are slightly elongated as compared to the crests 91 of the teeth shown in FIG. 8.

Figure 5:
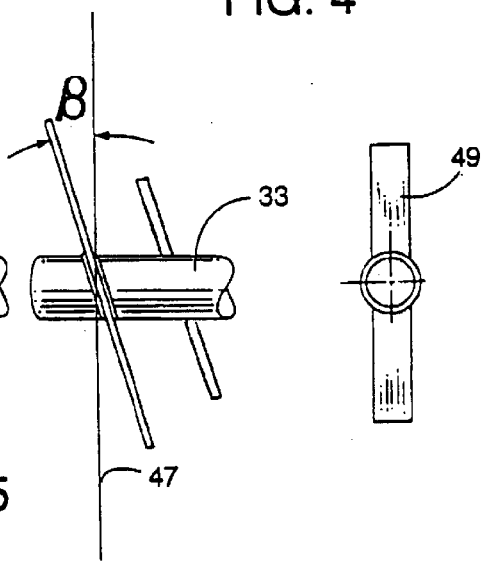
FIG. 5 is an isolated view of one tine and one disc of the combination mixing and distribution element of the invention illustrating the angular relationship thereof with respect to the longitudinal axis of the shaft.
Figure 6:
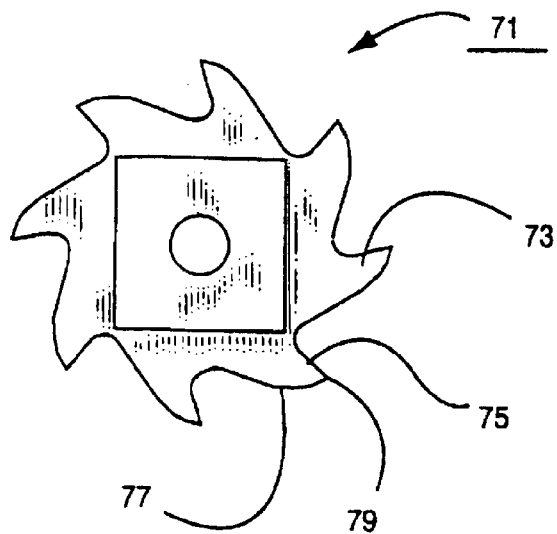
FIG. 6 is an isolated view of an alternate disc for use with the spreader of the invention.

As shown in FIG. 5, each disc 37 is uniformly inclined at an angle β in the range of about 15 to 20°, most preferably about 18° relative to an axis 47 drawing perpendicular to the longitudinal axis 39 of the shaft 33. The canted angle of the disc 37 on the shaft 33 provides a back and forth, undulating movement of the discs with respect to the material being distributed as the shaft rotates within the interior 23 of the hopper 13. The undulating action serves to both agitate the material and move it toward the discharge opening of the device. Gravity forces the composted material onto the disc which causes the material to be agitated and broken up by the left and right motion of the discs, thereby allowing the composted manure to fall through the discharge area of the device.

The combination mixing and distribution element 31, as shown in FIG. 2 also has a plurality of tines 49 located in between respective pairs 51, 53, of the discs 37. Each time arrangement located between a pair of discs comprises two tines located at 180° locations on the shaft 33. The tines 49 are generally rectangular-shaped bars and are also canted at the same approximate angle as the associated discs 51, 53 with respect to the longitudinal axis 39 of the shaft 33.

As shown in FIG. 1, the spreader 11 also includes a closure mechanism having a retractable slat or gate 51 which is located at the discharge opening of the hopper. The retractable slat 51 extends longitudinally along the outlet 35 and is positionable at variable angular positions by means of a hand lever 53 and associated linkages 55, 57, 59. The linkages 55, 57, 59 are connected at hinge points 61, 63, 65, 67 whereby movement of the hand lever 53 between the stop positions 69 serves to vary the opening angle of the gate 51.

The spreader 11 also includes any convenient means for driving the mixing and distribution element 31 in a rotational direction. In the simplest embodiment illustrated in FIG. 1, the drive means simply operates by driving the shaft 33 with one of the large drive tires 27 so that the device operates in push cart style. However, it will be understood that any number of drive mechanisms could be adapted for use on the spreader. For example, a small gasoline engine could be used to drive the drive wheels and shaft of the distribution element by means of either a pully or suitable intermeshing gears. Drive mechanisms for compost type spreaders are illustrated in U.S. Pat. Nos. 5,950,935; 4,805, 145, and 4,155,315, among others and will be within the skill of those familiar with the spreader arts.

An invention has been provided with several advantages. The compost spreader of the invention is simple in design and economical to manufacture. The device can be operated as a simple push cart or can be powered by a gasoline engine or pulled by a conveyance device. The hopper design along with the combination mixing and distribution element allows the device to apply a uniform spread of composted manure, even when the material is extremely powdery in nature or consists of lumps of dry material. The unique hopper design with its special mixing and distribution element assures that composts can be evenly spread without mixing or bridging and without causing undue dusting during application. The device can be formed from steel or a variety of synthetic materials, such as a suitable high density plastic, which reduces the cost of manufacture. The device is extremely reliable in operation requiring little or no maintenance.

While the invention has been shown in only one of its forms, it is not thus limited but is susceptible to various changes and modifications without departing from the spirit thereof.

What is claimed is:

1. A mobile spreading device for spreading compost material, the device comprising:

a hopper for receiving material to be transported and distributed, the hopper having a front wall, a rear wall, opposing side walls and a bottom wall which define an initially open interior;

a ground engaging wheel assembly supporting the hopper for transport across spreading ground;

a combination mixing and distribution element rotatably mounted in the interior of the hopper for conveying material received in the hopper interior to an elongated outlet located in a discharge area of the hopper;

a closure mechanism having a retractable slat which is positionable at variable angular positions for varying the discharge area of the hopper;

wherein the combination mixing and distribution element comprises a shaft having a longitudinal axis and having a plurality of discs located at spaced axial distances thereon, the discs being uniformly inclined at an angle in the range of 15–20° relative to line drawn perpendicular to the longitudinal axis of the shaft;

wherein the combination and mixing element also has a plurality of tines located on the shaft thereof, each tine being located between a pair of discs; and wherein each pair of discs on the shaft are separated by a pair of tines located at approximately 180° locations about the shaft, the tines also being inclined at the same angle of 15–20° with respect to a line drawn perpendicular to the longitudinal axis of the shaft.

2. The mobile spreading device of claim 1, wherein the discs are inclined at an angle of approximately 18° relative to a line drawn perpendicular to the longitudinal axis of the shaft.

3. The mobile spreading device of claim 1, wherein the tines lie in planes generally parallel to the planes of the discs in the interior of the hopper.

4. The mobile spreading device of claim 1, wherein each disc has a circumferential outer perimeter which forms a series of scallops, each scallop having an outer, blunt face defined between a pair of sloping sides.

5. The mobile spreading device of claim 1, wherein the hopper front wall is oriented generally perpendicular with respect to the ground, the front wall being separated by the bottom wall from the rear wall, and wherein the rear wall forms an angle in the range from about 30 to 40° with respect to the front wall.

6. The mobile spreading device of claim 1, further comprising means for driving the mixing and distribution element in a rotational direction.

7. The mobile spreading device of claim 6, wherein the ground engaging wheel assembly includes a pair of oppositely arranged front drive tires and at least on rear support tire, and wherein the driving means is a linkage between a selected one of the drive tires and the shaft.

8. The mobile spreading device of claim 1, wherein the cylindrical path of the outer edge of the continuous fighting of each mixing and distribution element substantially spans the opening distance of the discharge area of the hopper.

9. The mobile spreading device of claim 1, wherein the closure member is a slat which is pivotally mounted by a hinge on the hopper body and wherein the slat is attached to a hand operated lever for varying the angular position of the slat relative to the opening of the discharge area of the hopper.

* * * * *